(12) United States Patent
Nishida et al.

(10) Patent No.: US 12,108,005 B2
(45) Date of Patent: Oct. 1, 2024

(54) READING DEVICE, OUTPUT DEVICE, AND IMAGE FORMING DEVICE

(71) Applicant: FUJIFILM Business Innovation Corp., Tokyo (JP)

(72) Inventors: Yoji Nishida, Yokohama (JP); Hiroshi Watanabe, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 675 days.

(21) Appl. No.: 17/075,702

(22) Filed: Oct. 21, 2020

(65) Prior Publication Data

US 2021/0368057 A1 Nov. 25, 2021

(30) Foreign Application Priority Data

May 22, 2020 (JP) ................................. 2020-089538
May 22, 2020 (JP) ................................. 2020-089539
May 22, 2020 (JP) ................................. 2020-089540
May 22, 2020 (JP) ................................. 2020-089541
May 22, 2020 (JP) ................................. 2020-089542

(51) Int. Cl.
*H04N 1/04* (2006.01)
*F21V 8/00* (2006.01)
*H04N 1/028* (2006.01)

(52) U.S. Cl.
CPC ....... *H04N 1/02835* (2013.01); *G02B 6/0075* (2013.01); *H04N 1/02825* (2013.01); *H04N 1/0289* (2013.01); *G02B 6/005* (2013.01)

(58) Field of Classification Search
None
See application file for complete search history.

(56) References Cited

U.S. PATENT DOCUMENTS 5,982,511 A * 11/1999 Sato ................. G03G 15/04036
358/475
2004/0080796 A1* 4/2004 Lee ...................... H04N 1/0285
358/509
2005/0254101 A1* 11/2005 Chen .................. G02B 27/0018
358/474

(Continued)

FOREIGN PATENT DOCUMENTS

JP 2004274298 9/2004
JP 2004274299 9/2004

(Continued)

OTHER PUBLICATIONS

"Office Action of Japan Related Application No. 2020-089538", issued on Jan. 9, 2024, submit with English translation thereof, pp. 1-7.

(Continued)

*Primary Examiner* — Cheukfan Lee
(74) *Attorney, Agent, or Firm* — JCIPRNET

(57) ABSTRACT

Provided is a reading device including: a first emitting unit configured to emit light; an optical path unit having a reflection surface configured to reflect a part of light emitted from the first emitting unit, and an optical path configured to guide the part of light from the reflection surface to an original; and an image sensor that generates an image from specular reflection of the part of light guided by the optical path from the original.

12 Claims, 11 Drawing Sheets

(56) References Cited

U.S. PATENT DOCUMENTS

| | | | |
|---|---|---|---|
| 2012/0127537 A1* | 5/2012 | Takeuchi | H04N 1/00888 |
| | | | 358/442 |
| 2015/0002913 A1* | 1/2015 | Takahashi | H04N 1/125 |
| | | | 358/475 |
| 2017/0223223 A1* | 8/2017 | Netsu | H04N 1/02835 |

FOREIGN PATENT DOCUMENTS

| | | |
|---|---|---|
| JP | 2005102112 | 4/2005 |
| JP | 2010130444 | 6/2010 |
| JP | 2010147859 | 7/2010 |
| JP | 2013005334 | 1/2013 |
| JP | 2014230116 | 12/2014 |
| JP | 2014236329 | 12/2014 |
| JP | 2020071427 | 5/2020 |

OTHER PUBLICATIONS

"Office Action of Japan Related Application No. 2020-089539", issued on Jan. 9, 2024, submit with English translation thereof, pp. 1-12.

"Office Action of Japan Related Application No. 2020-089540", issued on Jan. 9, 2024, submit with English translation thereof, pp. 1-10.

"Office Action of Japan Related Application No. 2020-089541", issued on Jan. 9, 2024, submit with English translation thereof, pp. 1-8.

"Office Action of Japan Related Application No. 2020-089542", issued on Jan. 9, 2024, submit with English translation thereof, pp. 1-8.

* cited by examiner

READING DEVICE, OUTPUT DEVICE, AND IMAGE FORMING DEVICE

CROSS REFERENCE TO RELATED APPLICATIONS

This application is based on and claims priorities under 35 USC 119 from Japanese Patent Application No. 2020-089538 filed May 22, 2020, Japanese Patent Application No. 2020-089539 filed May 22, 2020, Japanese Patent Application No. 2020-089540 filed May 22, 2020, Japanese Patent Application No. 2020-089541 filed May 22, 2020, and Japanese Patent Application No. 2020-089542 filed May 22, 2020.

BACKGROUND

Technical Field

The present invention relates to a reading device, an output device, and an image forming device.

Related Art

Patent Literature 1 describes a reading device in which an incident angle to an original of light radiated by a second radiation section that radiates light for reading a part of a specular reflection light component from the original has an inclination of not 0 degree with respect to a reflection angle of a principal light ray of specular reflection light guided to a light guide section.

CITATION LIST

Patent Literature

Patent Literature 1: JP-A-2010-130444

SUMMARY

In a reading device in which an image shown on a reflection region that reflects reflection light reaching an image sensor is read, there is a merit that the larger the reflection region is, the larger an amount of the reflection light is, but on the other hand, when the specular reflection light is to be detected, light reflected on the reflection region tends to include diffuse reflection light other than the specular reflection light, which may affect image quality.

Aspect of non-limiting embodiments of the present disclosure relates to make it difficult to include the diffuse reflection light in light that reaches the image sensor by being reflected on a region of an original surface that reflects the specular reflection light reaching the image sensor.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading device including: a first emitting unit configured to emit light; an optical path unit having a reflection surface configured to reflect a part of light emitted from the first emitting unit, and an optical path configured to guide the part of light from the reflection surface to an original; and an image sensor that generates an image from specular reflection of the part of light guided by the optical path from the original.

BRIEF DESCRIPTION OF DRAWINGS

Exemplary embodiment(s) of the present invention will be described in detail based on the following figures, wherein.

DETAILED DESCRIPTION

[1] First Exemplary Embodiment

Figure 1:
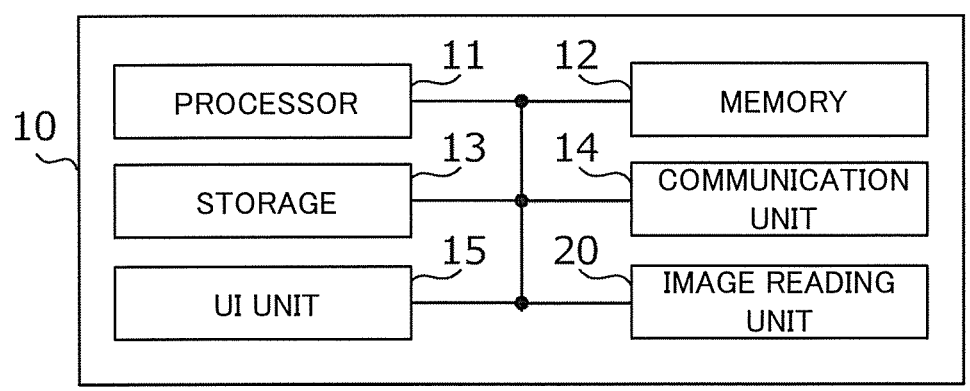
FIG. 1 shows a hardware configuration of an image reading device according to an exemplary embodiment.

FIG. 1 shows a hardware configuration of an image reading device 10 according to an exemplary embodiment. The image reading device 10 reads an image shown on an original. The image reading device 10 is an example of the "reading device" of the present invention. In this exemplary embodiment, the image reading device 10 includes a processor 11, a memory 12, a storage 13, a communication unit 14, a user interface (UI) unit 15, and an image reading unit 20. The image reading device 10 may include only the image reading unit 20.

The processor 11 includes, for example, an operation unit such as a central processing unit (CPU), a resistor, a peripheral circuit, and the like. The memory 12 is a recording medium readable by the processor 11, and includes a random access memory (RAM), a read only memory (ROM), and the like. The storage 13 is a recording medium readable by the processor 11, and includes, for example, a hard disk drive, a flash memory, or the like.

The processor 11 controls an operation of each hardware by executing a program stored in the ROM or the storage 13 by using the RAM as a work area. The communication unit 14 includes an antenna, a communication circuit, and the like, and performs communication via a communication line (not shown). A program executed by the processor 11 may be acquired from an external device that is communicated via the communication unit 14.

The UI unit 15 is an interface provided to a user who uses his own device. The interface receives input of information by a user and outputs information by the image reading device 10. The UI unit 15 includes, for example, a touch screen having a display which is a display section and a touch panel provided on a surface of the display, displays an image, and receives an operation from the user.

The image reading unit 20 includes a light source, an optical system, an image sensor, and the like, and reads the image shown on the original by reflecting light from the light source on the original. The image reading unit 20 supplies original image data, which shows the read original image, to the processor 11. The processor 11 performs various kinds of processing (such as printing processing and facsimile transmission processing) by using the supplied original image data.

Figure 2:
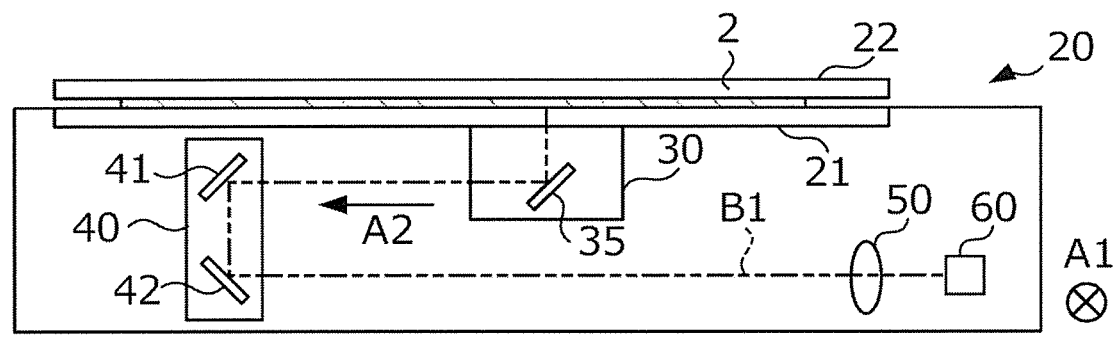
FIG. 2 shows a detailed configuration of the image reading unit.

FIG. 2 shows a detailed configuration of the image reading unit 20. FIG. 2 shows the image reading unit 20 viewed in a direction along a main scanning direction A1. The main scanning direction A1 in the drawing shows an arrow in a direction from the front to the back of a paper surface, but a direction from the back to the front of the paper surface is also referred to as the main scanning direction A1.

The image reading unit 20 includes an original table 21, an original cover 22, a carriage 30, a carriage 40, an image forming lens 50, and an image sensor 60. The image reading unit 20 has a width in the main scanning direction A1 in components to be illustrated. Each of the carriage 30, the carriage 40, the image forming lens 50, and the image sensor 60 has a long and thin shape using the main scanning direction A1 as a longitudinal direction. A direction indicated by an arrow with "A2" in the drawing is a sub-scanning direction A2. The image reading unit 20 is a reading device of a so-called reduction optical system.

The original table 21 is a transparent glass plate that supports an original 2 on which an image is read. The original table 21 may be an acrylic plate or the like as long as it is a transparent plate shaped member. The original cover 22 covers the original table 21 so as to block outside light, and the original 2 is sandwiched between the original cover 22 and the original table 21. The original 2 is supported by the original table 21 and the original cover 22 so as not to move.

When the original 2 is read, the carriage 30 moves in the sub-scanning direction A2 at a determined speed. The carriage 30 includes a radiation unit that irradiates the original 2 with light, but the radiation unit will be described later in detail with reference to FIG. 3. The carriage 30 includes a mirror 35. In this exemplary embodiment, the carriage 30 has a box shape whose upper portion opens, and the mirror 35 is disposed inside the carriage 30. It is not necessary that the carriage 30 has a box shape, and it is sufficient that the carriage 30 may move integrally even though it is a cavity. The mirror 35 reflects the light reflected by the original 2. The reflected light is guided to an optical path B1 leading to the image sensor 60.

When the original 2 is read, the carriage 40 moves in the sub-scanning direction A2 at a half speed of the carriage 30. The carriage 40 includes a mirror 41 and a mirror 42. The mirrors 41 and 42 reflect the light reflected by the mirror 35 and guide the light to the optical path B1. The image forming lens 50 images the light reflected by the mirror 42 at a determined position.

The image sensor 60 includes a light receiving element such as a charge coupled device (CCD), receives light imaged by the image forming lens 50, and generates an image signal depending on the received light. The image sensor 60 supplies the generated image signal to the processor 11 shown in FIG. 1. The processor 11 generates image data of the original 2 based on the supplied image signal.

Figure 3:
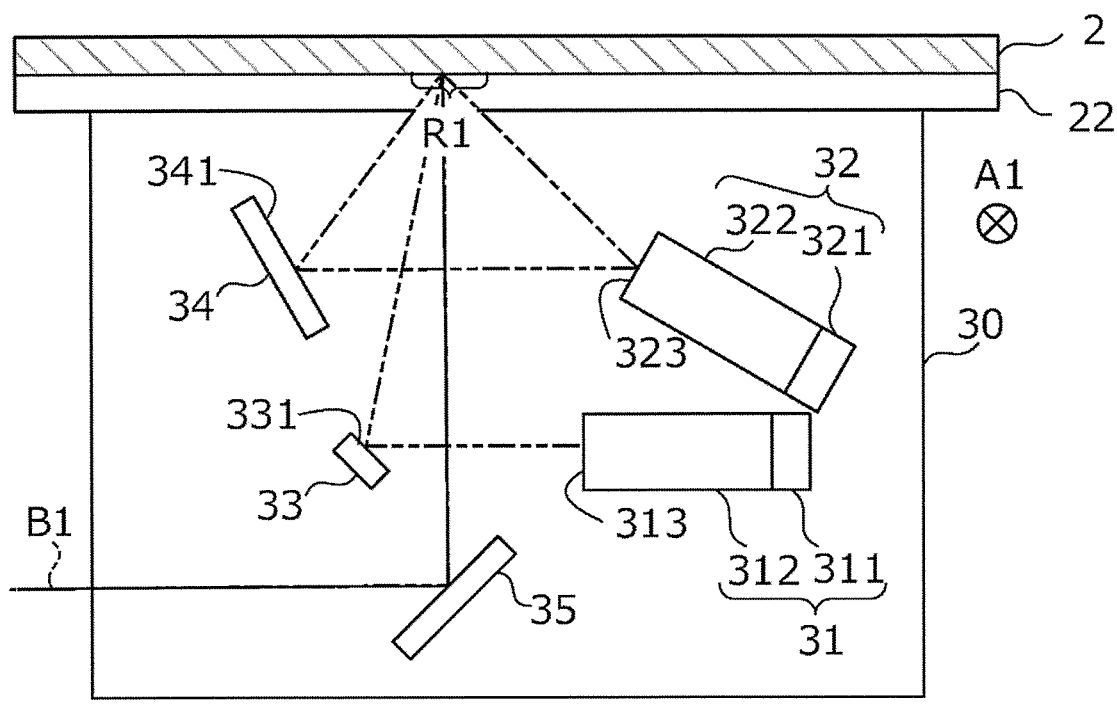
FIG. 3 is an enlarged view of a carriage.

FIG. 3 is an enlarged view of the carriage 30. The carriage 30 includes a light emitting unit for specular reflection 31, a light emitting unit for diffuse reflection 32, a reflector for specular reflection 33, a reflector for diffuse reflection 34, and a mirror 35.

The light emitting unit for specular reflection 31 includes an emission surface 313 and emits light from the emission surface 313. The light emitting unit for specular reflection 31 includes a light source 311 and a light guide 312. The light source 311 is a light source that emits light of a light emitting diode (LED) or the like. The light guide 312 is a transparent member that allows light to pass therethrough. In this exemplary embodiment, the emission surface 313 of the light guide 312 is a plane and guides the light from the light source 311 to the emission surface 313.

The light emitting unit for diffuse reflection 32 includes an emission surface 323 and emits light from the emission surface 323. The light emitting unit for diffuse reflection 32 includes a light source 321 and a light guide 322. The light source 321 is a light source that emits light of a LED or the like. The light guide 322 is a transparent member that allows light to pass therethrough. The light guide 322 includes a plane emission surface 323 and guides the light from the light source 321 to the emission surface 323. A structure itself of the light emitting unit for diffuse reflection 32 is similar to that of the light emitting unit for specular reflection 31. The light emitting unit for specular reflection 31 is an example of the "emitting unit" of the present invention, and the light emitting unit for diffuse reflection 32 is an example of a "second emitting unit" of the present invention.

Shapes of the emission surface 313 and the emission surface 323 will be described with reference to FIG. 4.

Figure 4:
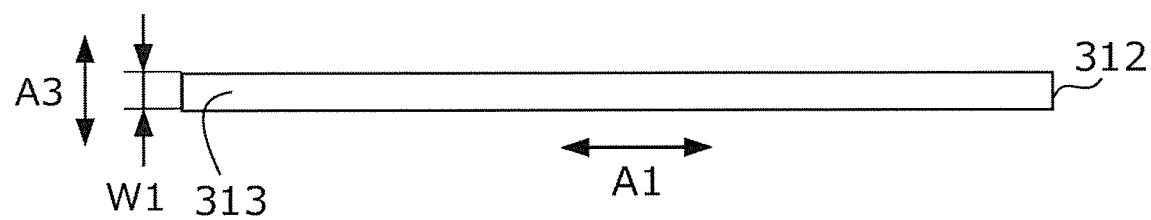
FIG. 4 is front view showing an emission surface.

FIG. 4 shows the emission surface 313 viewed from the front. The emission surface 313 is a surface using the main scanning direction A1 as the longitudinal direction, and has a rectangular shape when viewed from the front. The light guide 312, the light source 311, and the light emitting unit for specular reflection 31 including them are members using the main scanning direction A1 as the longitudinal direction. A dimension of the emission surface 313 in a transverse direction A3 is a length W1. The light emitting unit for diffuse reflection 32 is a member having a shape and size common to the light emitting unit for specular reflection 31. Therefore, the emission surface 323 is a surface using the main scanning direction A1 as the longitudinal direction, and has a rectangular shape when viewed from the front.

The light guide 312 has a part whose cross section crossed with a plane orthogonal to the emission surface 313 is rectangular, and the light guide 322 has a part whose cross section crossed with a plane orthogonal to the emission surface 323 is rectangular. When front shapes of the emission surface 313 and the emission surface 323 and the cross-sectional shapes of the light guide 312 and the light guide 322 are rectangular, as compared with a non-rectangular case, the luminous flux distribution is easy to be stable even when a tolerance occurs on the shape of the light guide temporarily.

When an imaginary plane parallel to the emission surface 313 is provided in the space irradiated with light, the luminous flux distribution is represented by luminous flux that passes through each position of the plane.

Figure 5:
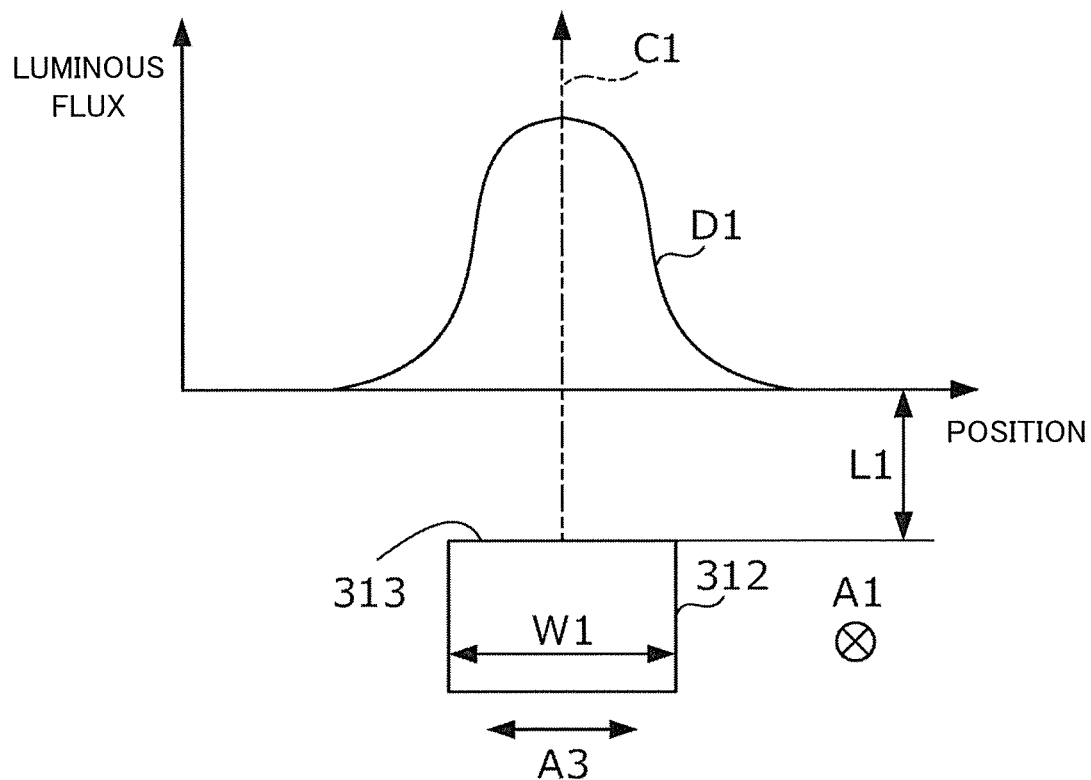
FIG. 5 shows an example of luminous flux distribution of light emitted by a light emitting unit for specular reflection.

FIG. 5 shows an example of luminous flux distribution of the light emitted by the light emitting unit for specular reflection 31. In an example of FIG. 5, distribution D1 of the luminous flux in a case where a plane located at a distance L1 from the emission surface 313 of the light guide 312 is viewed in a direction along the main scanning direction A1 is shown in the graph.

As described above, the carriage 30 has a long and thin shape using the main scanning direction A1 as the longitudinal direction. The light source 311, the light guide 312, and the light emitting unit for specular reflection 31 including them, and the light source 321, the light guide 322, and the light emitting unit for diffuse reflection 32 including them, which are included in the carriage 30, are all members using the main scanning direction A1 as a longitudinal direction. That is, the longitudinal direction of the members is along the main scanning direction A1.

The emission surface 313 is a surface using the main scanning direction A1 as the longitudinal direction. A direction orthogonal to the main scanning direction A1 and the longitudinal direction and along the emission surface 313 is referred to as a transverse direction A3. A horizontal axis of the graph shown in FIG. 5 represents a position on a space in the transverse direction A3. A vertical axis of the graph shown in FIG. 5 represents luminous flux passing through each position. Here, an optical path of light emitted in a normal direction of the emission surface 313 through the center of the emission surface 313 is set as an optical axis C1.

The luminous flux at each position on the space in the transverse direction A3 is the largest at the optical axis C1, and decreases as a distance from the optical axis C1 increases. Distribution D1 of the luminous flux extends to a range wider than the length W1 of the emission surface 313 in the transverse direction A3. This is due to a fact that the emission surface 313 is not a perfect plane and has some undulations and the emitted light is diffused, a property that light travels in addition to going straight, or the like. As shown in FIG. 3, a shape of a reflector for specular reflection 33 is devised so that only a part of the light emitted from the emission surface 313 is reflected toward the original 2.

Figure 6:
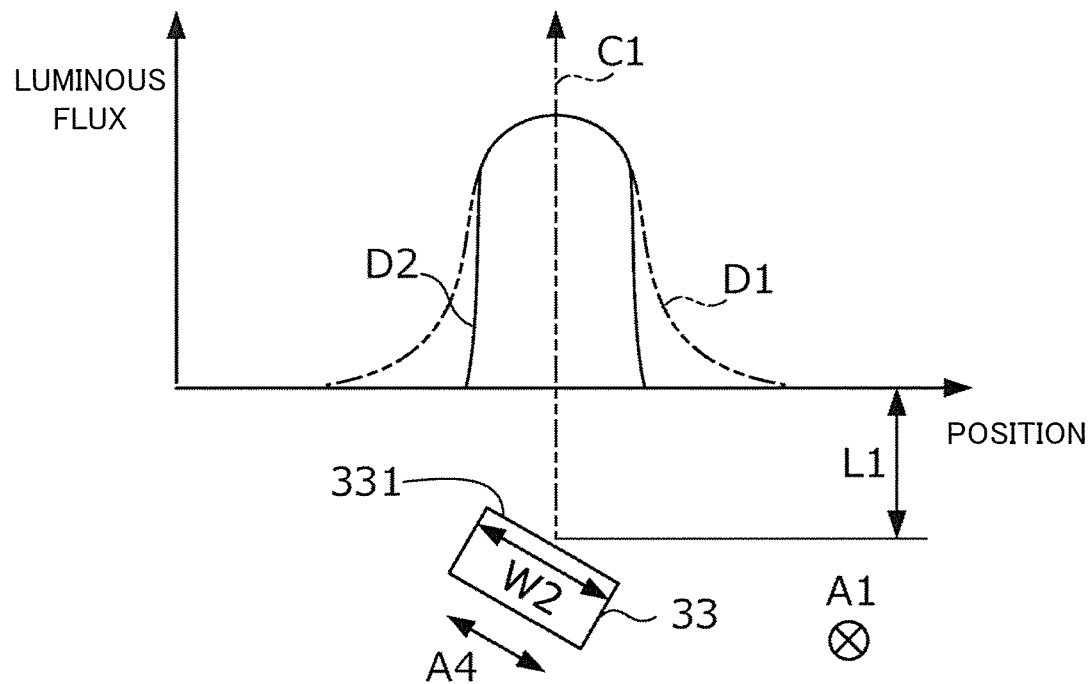
FIG. 6 shows an example of luminous flux distribution of reflection light reflected by a reflector for specular reflection.

FIG. 6 shows an example of luminous flux distribution of the reflection light reflected by the reflector for specular reflection 33. FIG. 6 shows the reflector for specular reflection 33 and distribution D2 of an amount of reflection light reflected thereon. A length W2 of the reflector for specular reflection 33 in a transverse direction A4 is shorter than a length W1 of the emission surface 313 in the transverse direction A3. The length W2 is not only smaller than the length W1, but is smaller than a length of a reflection surface 341 of the reflector for diffuse reflection 34 in the transverse direction.

Further, the length W2 is smaller than the length of the emission surface 323 of the light emitting unit for diffuse reflection 32 in the transverse direction. On the other hand, the length of the reflection surface 341 in the transverse direction is larger than the length of the emission surface 323 in the transverse direction. In this exemplary embodiment, the length W1 and the length of the emission surface 323 in the transverse direction are the same. In this exemplary embodiment, the length W1 is 4.5 mm, and the length W2 is 2.0 mm In FIG. 6, the distribution D1 of the luminous flux shown in FIG. 5 is shown by a two-dot chain line. Since light outside the reflector for specular reflection 33 is not reflected by the reflector for specular reflection 33, the luminous flux outside the reflector for specular reflection 33 is reduced in the distribution D2 of the luminous flux as compared with the distribution D1. However, since the light reflected by the reflector for specular reflection 33 diverges slightly after being reflected by the reflector for specular reflection 33 and a width as a light ray spreads, light appears outside the width of the reflector for specular reflection 33 until reaching the original. The reflector for specular reflection 33 is an example of a "reflection member" of the present invention. The reflection surface 331 is an example of the "reflection surface", and is a plane reflection surface in this exemplary embodiment.

As shown in FIG. 5, the luminous flux emitted by the light emitting unit for specular reflection 31 is the largest at the optical axis C1. The reflection surface 331 of the reflector for specular reflection 33 reflects light around the optical axis C1. That is, the reflection surface 331 is disposed in a direction in which the luminous flux emitted by the light emitting unit for specular reflection 31 is the largest. By setting the optical path to include the optical axis Cl while limiting light in the optical path as described above, stable light may be oriented to the original 2. A direction of the reflection surface 331 is fixed such that light reflected by the reflection surface 331 reaches a reading region R1 of the original 2 shown in FIG. 3.

When the light reflected by the reflection surface 331 reaches the reading region RI of the original 2, the original 2 reflects the light. The light reflected by the original is an example of an "original reflection light" of the present invention. Although both specular reflection and diffuse reflection are included in the original reflection light, the light specularly reflected by the original 2 goes toward the mirror 35 in this exemplary embodiment. The specular reflection referred to here is not limited to perfect specular reflection in which an incident angle and a reflection angle perfectly coincide, and includes a case where they deviate some angles if almost the same characteristics are obtained.

In this exemplary embodiment, the mirror 35 is disposed vertically downward as viewed from a reading region R1. By disposing as described above, it is possible to correspond to a case where the original 2 floats from the original table 21.

Figure 7A:
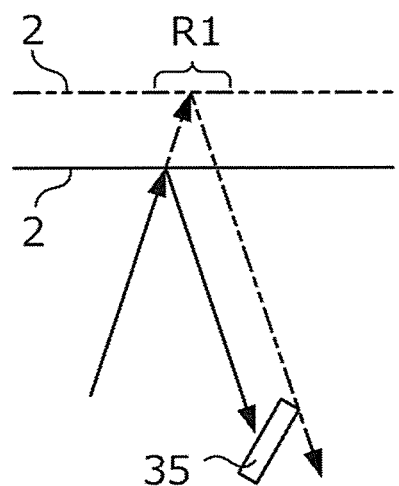
FIG. 7A is a diagram for illustrating a sate where an original floats in a case where the minor 35 is not disposed vertically downward as viewed from the reading region R1.
Figure 7B:
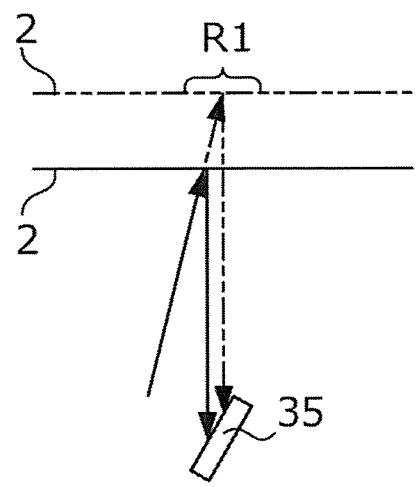
FIG. 7B is a diagram for illustrating a state where an original floats in a case where the mirror 35 is disposed vertically downward as viewed from the reading region R1.

FIG. 7 is a diagram for illustrating a case where the original 2 floats. FIG. 7A shows a case where the mirror 35 is not disposed vertically downward as viewed from the reading region R1, and FIG. 7B shows a case where the mirror 35 is disposed vertically downward as viewed from the reading region R1.

Since an incident angle with respect to the original 2 of specular reflection light incident on the mirror 35 of FIG. 7A is smaller than that of specular reflection light incident on the mirror 35 of FIG. 7B, it is easy that an optical path of the specular reflection light in a case where the original 2 floats largely deviates and is not incident on the mirror 35. That is, even if a positional relationship between the mirror 35 and the original 2 changes due to floating of the original 2 or the like, decrease in the specular reflection light reflected on the mirror 35 is reduced in the case of FIG. 7B as compared with the case of FIG. 7A.

On the other hand, when light to be specularly reflected completely vertically downward is to be received, the incident light also needs to be incident from the vertically downward. However, since it is structurally impossible, the incident light is inclined at about 5 degrees. Although the light is not perfect specular reflection light, reflection characteristics are detected almost in the same manner as the specular reflection light. A similar image as that of specular reflection light is detected to some extent as long as the inclined angle is not limited to 5 degrees but equal to or less than 9 degrees as in this exemplary embodiment.

The light reflected by the mirror 35 is guided to the optical path B1 (optical path leading to the image sensor 60) shown in FIG. 2. In this way, regarding the light to be specularly reflected by the original 2, the reflector for specular reflection 33 forms an optical path that guides a part of light emitted from the emission surface 313 of the light guide 312 that goes toward the reflection surface 331 of the reflector for specular reflection 33 to the original 2, that is, an optical path of light going toward the reflector for specular reflection 33 and an optical path reflected by the reflector for specular reflection 33 and going toward the original 2. The reflector for specular reflection 33 is an example of an "optical path unit" of the present invention.

The light guided by the reflector for specular reflection 33 and specularly reflected by the original 2 is guided by the minor 35, the minor 41, the mirror 42, and the image forming lens 50 and reaches the image sensor 60. The image sensor 60 generates an image shown by arrived light, that is, the light specularly reflected by the original 2. As described above, a part of the light emitted by the light emitting unit for specular reflection 31 is specularly reflected by the original 2 to show an image.

On the other hand, the light emitted by the light emitting unit for diffuse reflection 32 is diffusely reflected by the original 2 to show an image. Most of the light emitted from the emission surface 323 of the light guide 322 of the light emitting unit for diffuse reflection 32 directly goes toward the reading region of the original 2, but the reflector for diffuse reflection 34 is provided so that the light not directly going toward the original 2 is also oriented to the original 2. Since the diffuse reflection light is desired to be received as much as possible, a larger luminous flux is configured to go to the original 2 as described above.

Therefore, the reflection surface 341 of the reflector for diffuse reflection 34 has a width such that the light from the emission surface 323 to the reflector for diffuse reflection 34 goes toward the reading region of the original 2, and is fixed in a direction to reflect in a direction toward the reading region of the original 2. In other words, the reflector for specular reflection 33 is provided at a position where the specularly reflected light in the light reflected by the reflection surface 331 and reaching the original 2 does not go toward the optical path B1.

Therefore, the light diffusely reflected in the light reaching the original 2 goes toward the optical path B1 as shown in FIG. 3. The light going toward the optical path B1 in this way is guided to the image sensor 60 by the mirror 35 or the like. As described above, the light emitting unit for diffuse reflection 32 is disposed to guide the light in which the light emitted by the light emitting unit for diffuse reflection 32 is diffusely reflected by the original 2 to the image sensor 60 by the optical path B1 which is a common optical path with the light emitted by the light emitting unit for specular reflection 31 and specularly reflected by the original 2 diffusion The light emitted from the emission surface 323 of the light guide 322 and directly going toward the reading region of the original 2 is also diffusely reflected by the original and goes toward the optical path B1. As described above, the reading region of the original 2 diffusely reflects the light going from two directions separately, and the diffuse reflection light is guided to the image sensor 60 by the optical path B1, which is a common optical path to that of the above-described specular reflection light. The image sensor 60 generates an image shown by arrived light, that is, the light diffusely reflected by the original 2.

Next, detailed configurations of the light source 311 and the light source 321 will be described.

Figure 8:
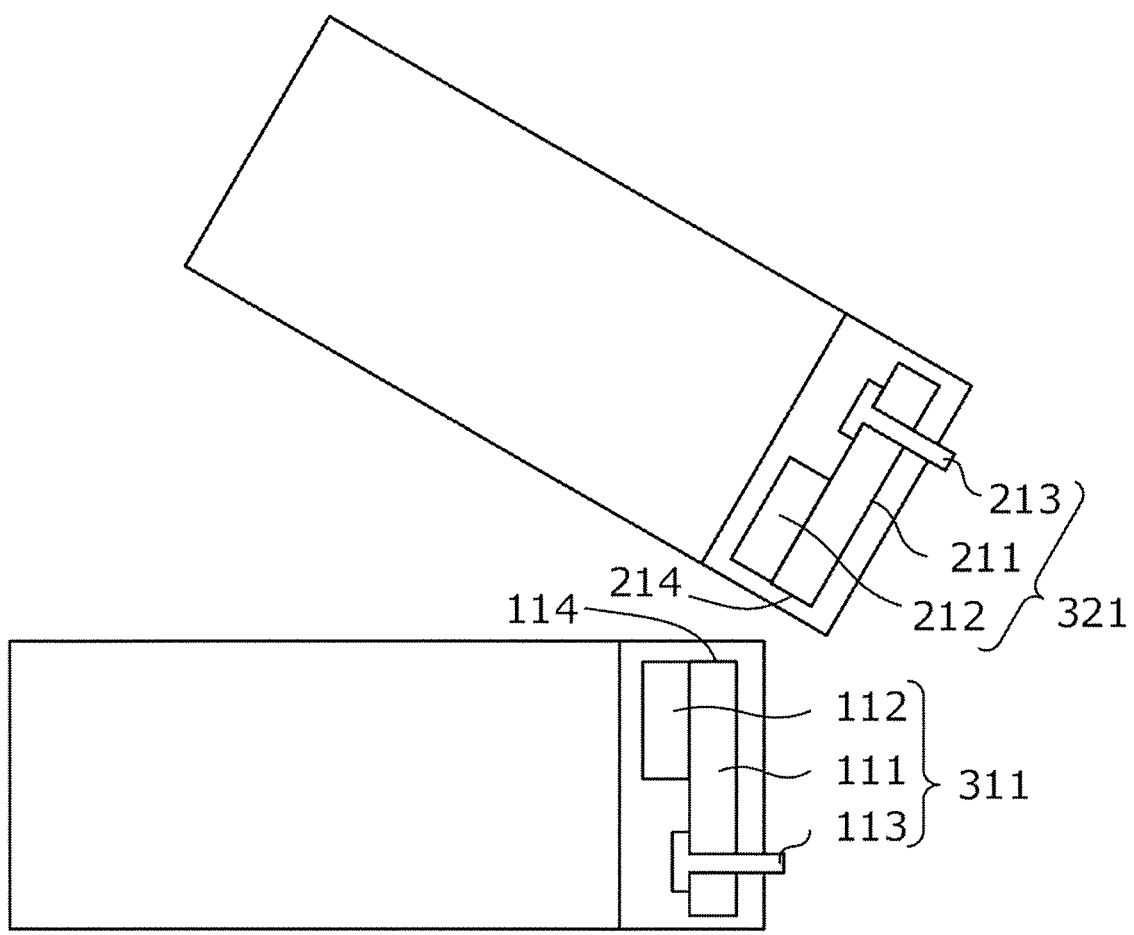
FIG. 8 is an enlarged view of two light sources.

FIG. 8 is an enlarged view of the light source 311 and the light source 321. The light source 311 includes a substrate 111 that supports an electronic circuit, a light emitting unit 112 that emits light, and a fastener 113 that fixes the substrate 111. The light emitting unit 112 is, for example, an LED array, and is provided against an end 114 on a lower side of the substrate 111. The substrate 111 is fixed to a frame of the light source 311 by the fastener 113 provided on a side opposite to the end 114.

The light source 321 includes a substrate 211 that supports an electronic circuit, a light emitting unit 212 that emits light, and a fastener 213 that fixes the substrate 211. The light emitting unit 212 is, for example, an LED array, and is provided against an end 214 on a lower side of the substrate 211. The substrate 211 is fixed to a frame of the light source 321 by the fastener 213 provided on a side opposite to the end 214. The substrate 111 and the light emitting unit 112 are provided in different directions, but are manufactured as components common to the substrate 211 and the light emitting unit 212.

Accordingly, as compared with a case where these are different components, the number of manufacturing lines of the components is reduced, and a cost of manufacturing the components is reduced. Further, since each fastener is provided on a side opposite to the light emitting unit, the light emitting unit 112 and the light emitting unit 212 are disposed closer in a case where the position of the fastener is different from that in this exemplary embodiment.

As shown in FIG. 8, the light source 311 and the light source 321 are provided so that the end 114 of the substrate 111 and the end 214 of the substrate 211 adjoin each other. Accordingly, compared with a case where the end 114 of the substrate 111 and the end 214 of the substrate 211 does not adjoin each other, the light emitting unit 112 and the light emitting unit 212 are disposed close to each other, and wiring for supplying power to each light emitting unit may be short.

A reflector, a mirror, and the like are disposed such that reflection light of the original 2 is guided to the image sensor 60 through the optical path B1, which is a common optical path of the specular reflection light and the diffuse reflection light, but timing of radiating light is separately done. First, the image reading unit 20 turns on the light emitting unit for diffuse reflection 32 to move the carriage 30 and the carriage 40 to an end portion of the original in the sub-scanning direction, reads the original 2, and supplies original image data indicating an image of the diffuse reflection light of the original 2 to the processor 11.

Subsequently, when the carriage 30 and the carriage 40 are restored from the end portion in the sub-scanning direction to the original position, the light emitting unit for specular reflection 31 is turned on to read the original 2, and the original image data indicating the image of the specular reflection light of the original 2 is supplied to the processor 11. In this way, in this exemplary embodiment, the image shown by the specularly reflected light and the image shown by the diffusely reflected light are separately read with respect to one original. The processor 11 perfoms processing of obtaining one image by using image data indicating the two supplied images.

In this exemplary embodiment, although the reading region R1 is sandwiched between the reflector for diffuse reflection 34 and the light emitting unit for diffuse reflection 32, the light emitting unit for diffuse reflection 32 may be disposed on both sides of the reading region R1. In this exemplary embodiment, shapes of the light guides for specular reflection and diffuse reflection are the same but may change. Shapes of cross sections in a direction perpendicular to the longitudinal direction of the light guide are the same, but the shapes may change in the longitudinal direction. In addition, the emission surface may be polyhedral rather than one plane.

In this exemplary embodiment, the light emitted by the light emitting unit for specular reflection 31 is specularly reflected by the reflector for specular reflection 33 as described above, and light having a narrow range of luminous flux distribution (Full width at half maximum) is specularly reflected by the original 2 as shown in FIG. 6 and guided to the image sensor 60. When the range of luminous flux distribution of the light incident on the region of the surface of the original 2 that reflects the specular reflection light is too wide, the specular reflection light of the light from a certain region like the optical axis C1 and another region which is a distant therefrom is deviated from the optical path B1 in this exemplary embodiment, and conversely the diffuse reflection light of the light goes toward the optical path B1.

Figure 9A:
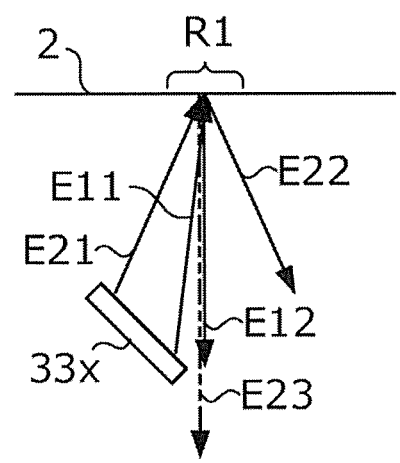
FIG. 9A shows an example in which diffuse reflection light is mixed with specular reflection light.
Figure 9B:
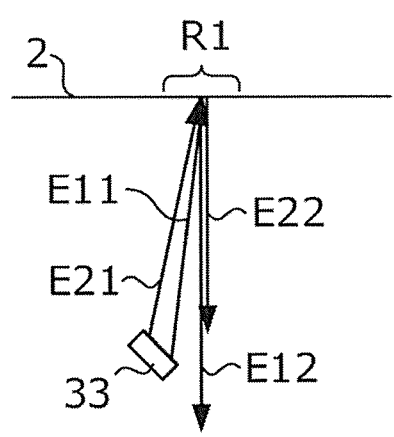
FIG. 9B shows an example in which diffuse reflection light is not mixed with specular reflection light.

FIG. 9 shows an example in which diffuse reflection light is mixed with specular reflection light. FIG. 9A shows, as a comparative embodiment, a state in which the diffuse reflection light of the light emitted by the light emitting unit for specular reflection 31 and reflected by the reflector for specular reflection 33x goes toward the image sensor 60. Although the light incident on the original 2 through an optical path E11 where an incident angle is deep (the closer an angle formed with respect to the original 2 is to 90°, the deeper the incident angle is) has an angle relationship with light going toward the image sensor 60 through an optical path E12 of almost specular reflection, in the light incident on the original 2 through an optical path E21 having a shallow incident angle, specular reflection light does not go toward the image sensor 60 through an optical path E22.

Instead, the diffuse reflection light of the light incident on the original 2 through the optical path E21 goes toward the image sensor 60 through an optical path E23. In such a case, since the image sensor 60 receives both the specular reflection light and the diffuse reflection light at the same time, specular reflection light characteristics of the image cannot be obtained. Similarly, when the reflection light is not oriented vertically downward, diffuse reflection light of light whose incident angle is greatly deviated is mixed with the specular reflection light when variation in the incident angle is not reduced.

Therefore, in this exemplary embodiment, by making a size (length in the transverse direction) of the reflection surface 331 of the reflector for specular reflection 33 smaller than a size of the emission surface 313, the incident angle of the light going toward the original does not change significantly. Thus, compared with a case where the size of the reflection surface 331 is larger than the size of the emission surface 313, the reflector for specular reflection 33 has a size that reduces the variation in the incident angle of the light going toward the emission surface original, and increases a ratio of the specular reflection light component to a component of the light (an example of the "original reflection light" in the present invention) reflected by the original 2 and going toward the mirror 35.

In this exemplary embodiment, since the light paths of the diffuse reflection light and the specular reflection light are common, the size of the reading device is reduced as compared with a case where the optical paths of the diffuse reflection light and the specular reflection light are different. In this exemplary embodiment, the reflection surface 331 of the reflector for specular reflection 33 is disposed in a direction in which the luminous flux emitted by the light emitting unit for specular reflection 31 is the largest. As a result, compared with a case where the reflection surface 331 is disposed in another direction, it is prevented that a part with a small luminous flux in the specular reflection light is easily included, and luminance of the generated image is increased.

In this exemplary embodiment, by making light part with the reflector for specular reflection 33, a new component may not be supplemented, and the number of components may be reduced.

In this way, since a width of the reflection surface of the reflector for specular reflection 33 is narrow when the light emitted by the light emitting unit for specular reflection 31 reaches the reflector for specular reflection 33, only a part of light goes toward the original direction, and other light escapes behind the reflector for specular reflection 33 and does not go toward the original direction. That is, only a certain region of the radiated light goes toward the original direction, and other regions of the light do not go toward the original direction. This is different from a configuration in which only a specific component of light is adjusted to go toward the original by providing a filter or the like in the entire optical paths and the luminous flux is reduced by transparency of the light.

[2] Second Exemplary Embodiment

In the first exemplary embodiment, light guided to the original 2 is limited by reducing the size of the reflector for specular reflection 33, but in the second exemplary embodiment, light is limited by using a slit.

Figure 10:
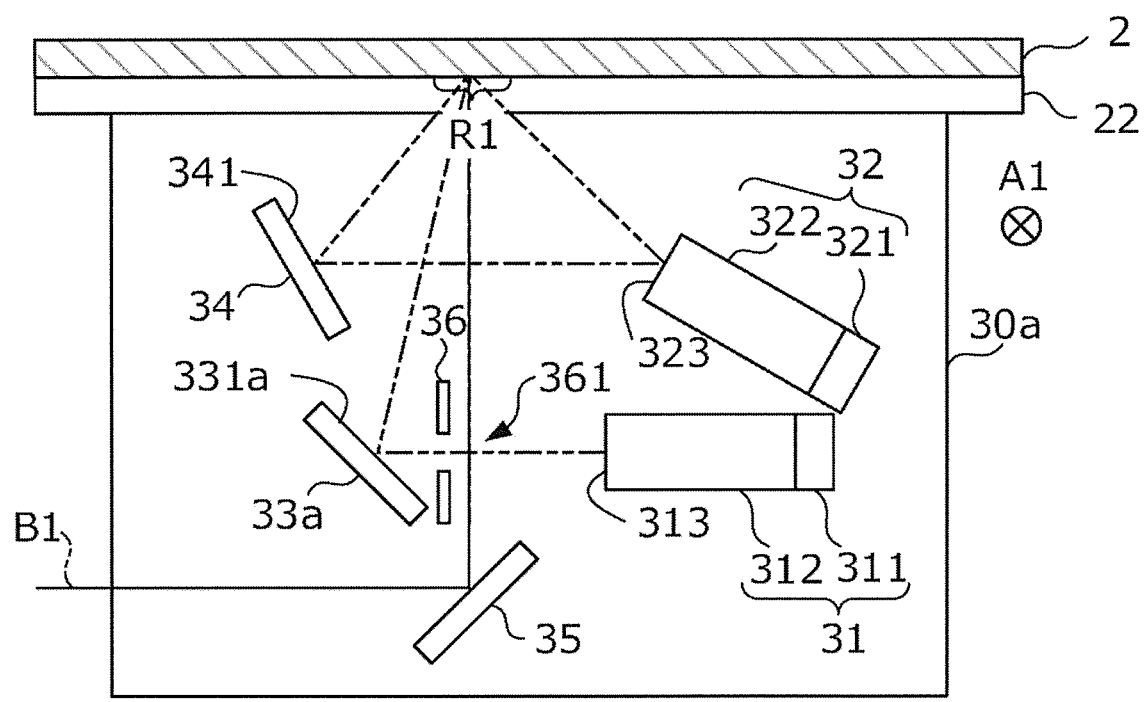
FIG. 10 is an enlarged view of a carriage of a second exemplary embodiment.

FIG. 10 is an enlarged view of a carriage 30a of the second exemplary embodiment. The carriage 30a includes the light emitting unit for specular reflection 31, the light emitting unit for diffuse reflection 32, a reflector for specular reflection 33a, the reflector for diffuse reflection 34, the mirror 35, and a slit member 36. A part of light emitted from the emission surface 313 of the light emitting unit for specular reflection 31 passes through the slit member 36 and reaches the reflector for specular reflection 33 as shown in FIG. 10.

The slit member 36 has a slit 361 that allows light to pass through, and blocks a part of the light emitted from the emission surface 313. The slit member 36 is an example of a "blocking unit" of the present invention. Hereinafter, light that has passed through the slit 361 is referred to as "slit passing light". Distribution of an amount of slit passing light will be described with reference to FIG. 11.

Figure 11:
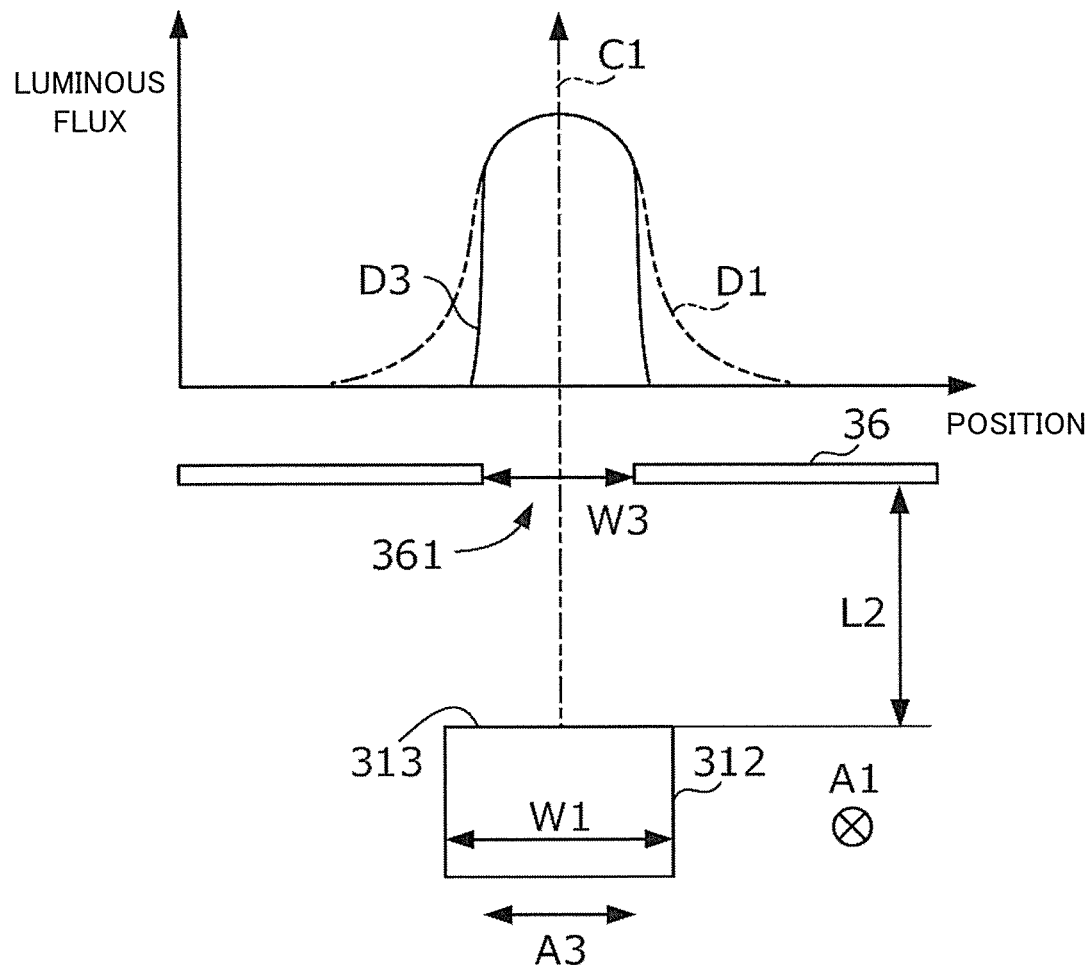
FIG. 11 shows an example of luminous flux distribution of slit passing light.

FIG. 11 shows an example of luminous flux distribution of the slit passing light. FIG. 11 shows the slit member 36 disposed at a distance L2 from the emission surface 313 of the light guide 312 and distribution D3 of the amount of the slit passing light in a space in front of the slit member 36. A width W3 of the slit 361 of the slit member 36 is smaller than the length W1 of the emission surface 313 in the transverse direction A3. In FIG. 11, the distribution D1 of the luminous flux shown in FIG. 5 is shown by a two-dot chain line.

Since light outside the slit 361 is blocked by the slit member 36, an amount of the light outside the slit 361 is significantly reduced in the distribution D3 of the luminous flux compared with the distribution D1. However, since the slit passing light slightly diverges even after passing through the slit 361 and the width as a light ray increases, the luminous flux appears outside the slit 361. Disposition and a size of the slit member 36 will be described in detail with reference to FIG. 12.

Figure 12:
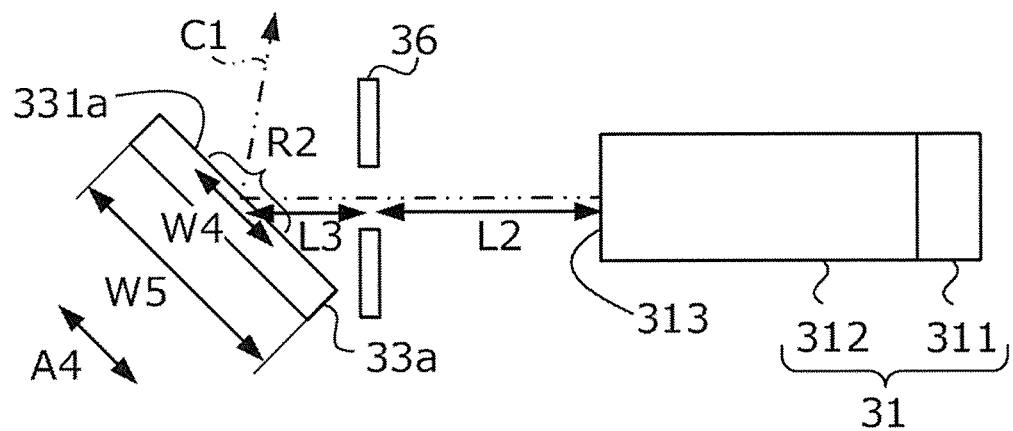
FIG. 12 is an enlarged view of surroundings of a slit member.

FIG. 12 is an enlarged view of surroundings of the slit member 36. As described above, the slit member 36 is disposed at a position of the distance L2 from the emission surface 313 of the light guide 312. Further, the slit member 36 and the reflector for specular reflection 33a are separated by a distance L3, for example, along the optical axis C1. The reflector for specular reflection 33a is a member having a reflection surface 331a that reflects the light emitted from the emission surface 313 toward the original 2.

In the second exemplary embodiment, a reflector having a length in the transverse direction longer than that in the first exemplary embodiment is used. In this way, even if positions of the slit member and the reflector for specular reflection 33a are slightly deviated, the light certainly goes to the reflector for specular reflection 33a. However, the present invention is not limited thereto, and the width of light may be narrowed stepwise by, for example, the slit member or the reflector for specular reflection 33a.

As shown in the drawing, the distance L3 is shorter than the distance L2. That is, the slit member 36 is disposed closer to the reflection surface 331a of the reflector for specular reflection 33a than the emission surface 313. As described in the description of FIG. 6, since the light that has passed through the slit 361 diverges, distribution of luminous flux reaching the reflection surface 331a does not spread as compared with a case where the slit member 36 is disposed closer to the emission surface 313 than the reflection surface 331a by disposing the slit member 36 as described above.

Similarly to the emission surface 313 of the light guide 312, the reflection surface 331a of the reflector for specular reflection 33a is a surface using the main scanning direction A1 as the longitudinal direction, and has a rectangular shape when viewed from the front. A length W5 of the reflection surface 331a in the transverse direction A4 is longer than a length W4 in the transverse direction A4 of a reflection region R2 the slit passing light reaches among the reflection surface 331a. That is, the reflection surface 331a does not reflect the slit passing light on the entire surface, but reflects the slit passing light on a partial region of the surface.

In this exemplary embodiment, the reflector for specular reflection 33a prevents the diffuse reflection light from mixing with the light going toward the minor 35 among the above-described original reflection light. Here, the "light going toward the mirror 35" includes only the light reaching the reflection surface 331a when the slit member 36 is not present among the light emitted from the emission surface 313 of the light guide 312, and excludes light reaching a position deviated from the reflection surface 331a when the slit member 36 is not present.

In this exemplary embodiment, by narrowing the range of luminous flux distribution by the slit member 36, it becomes difficult to include the diffuse reflection light in light that reaches the image sensor 60 by being reflected on a region of an original surface that reflects the specular reflection light reaching the image sensor 60, as compared with a case where the slit member 36 is not included.

[3] Modifications

The exemplary embodiments described above are merely examples of carrying out the present invention, and may be modified as follows. In addition, the exemplary embodiments and modifications may be implemented in combination as necessary.

[3-1] Reflector

The reflection surface 331 of the reflector for specular reflection 33 is a plane in the exemplary embodiment, but the shape of the reflection surface 331 is not limited to this. The reflection surface 331 may have a shape that reflects the light emitted from the emission surface 313 of the light guide 312 toward the original 2 to be convergent light. The reflector for specular reflection 33 is an example of a "reflection member" of the present invention.

The convergent light refers to light that converges toward a determined focal point. The focal point may be set on the original or may be set on the back or front of the original. The reflection surface 341 of the reflector for diffuse reflection 34 may also have a shape that reflects the light emitted from the emission surface 323 of the light guide 322 toward the original 2 to be convergent light.

Figure 13:
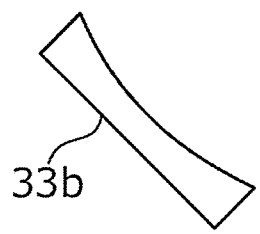
FIG. 13 shows a reflector for specular reflection of a modification.

FIG. 13 shows a reflector for specular reflection 33b of this modification. The reflector for specular reflection 33b has a concave reflection surface 331b, and reflects the light emitted from the emission surface 323 toward the original 2 to be convergent light. The reflection surface 331b is not limited to the shape shown in the drawing, but may be concave, polyhedral, curved, or the like.

Further, in the first exemplary embodiment, the width W2 of the reflector for specular reflection 33 is narrowed as the width W2 is half or less than the length W1 of the emission surface 313 in the transverse direction A3, but may be the same or reversely long without need to narrow to that extent in the case of being convergent light. According to this modification, for example, the luminous flux to be reflected by the original 2 is enhanced as compared with a case where the emitted light is reflected toward the original 2 to become divergent light.

[3-2] Blocking Unit

The blocking unit, which is a member that blocks a part of the light emitted from the emission surface 313 of the light guide 312, is not limited to the slit member 36 described in the second exemplary embodiment. For example, the slit member 36 is disposed between the light guide 312 and the reflector for specular reflection 33, but may be disposed between the reflector for specular reflection 33 and the original 2.

In addition, a masking member that adheres to the emission surface 313 and covers a part of the emission surface 313 may be a blocking unit. In any case, since the range of luminous flux distribution narrows by blocking a part of light that goes toward the original 2 by the blocking unit, it becomes difficult to include the diffuse reflection light in light that reaches the image sensor 60 by being reflected on a region of an original surface that reflects the specular reflection light reaching the image sensor 60, as compared with a case where the blocking unit is not included.

[3-3] Blocking Unit That Blocks Different Light

The blocking unit above may include a blocking unit that blocks different light.

Figure 14:
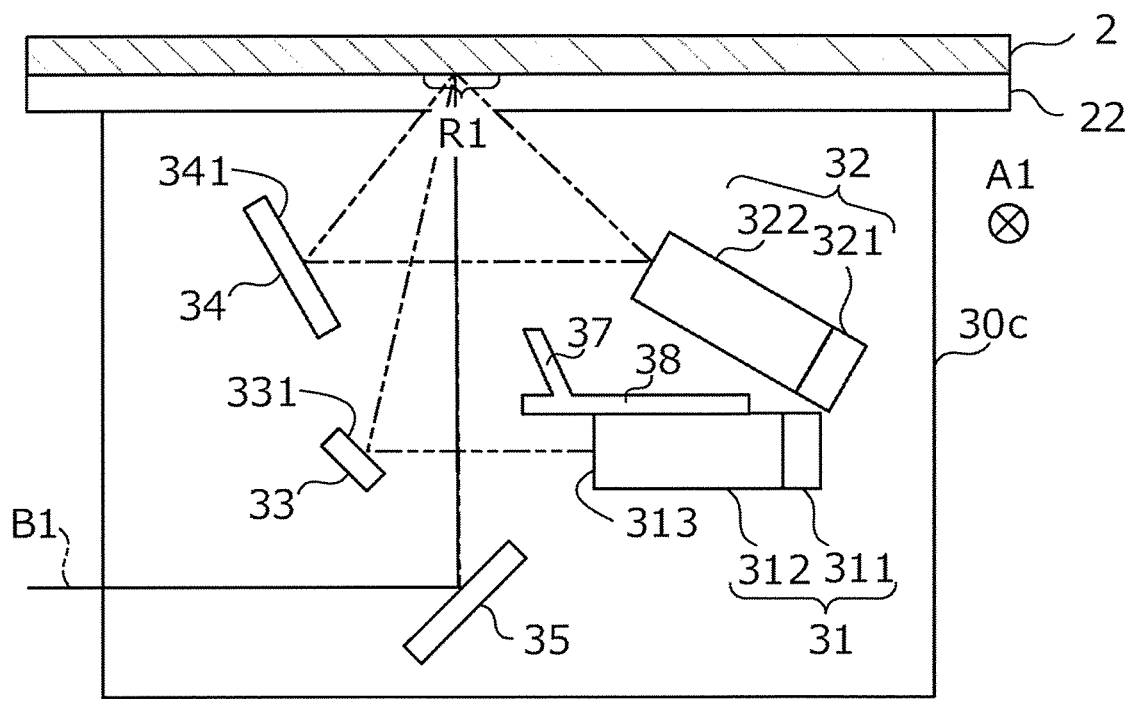
FIG. 14 is an enlarged view of a carriage of a modification.

FIG. 14 is an enlarged view of a carriage 30c of this modification. The carriage 30c includes a second blocking member 37 and a third blocking member 38 in addition to the units shown in FIG. 3. The second blocking member 37 is a plate shaped member provided between the emission surface 323 of the light emitting unit for diffuse reflection 32 and the reflection surface 331 of the reflector for specular reflection 33, and prevents light emitted from the emission surface 323 from directly reaching the reflection surface 331.

By providing the second blocking member 37, an event in which quality of an image read by mixing light emitted for diffuse reflection with light for specular reflection changes is prevented from occurring. The third blocking member 38 is a plate shaped member provided between the emission surface 313 of the light emitting unit for specular reflection 31 and the reflection surface 341 of the reflector for diffuse reflection 34, and is formed integrally with the second blocking member 37.

The third blocking member 38 prevents the light emitted from the emission surface 313 from directly reaching the reflection surface 341. The third blocking member 38 is an example of a "second blocking unit" of the present invention. By providing the third blocking member 38, an event in which quality of an image read by mixing light emitted for specular reflection with light for diffuse reflection changes is prevented from occurring.

[3-4] Entrance of Light

In the exemplary embodiment described above, light from the radiation unit is once reflected by the reflector for specular reflection 33 so as not to cause light to enter the reading region R1 of the original 2 except the reflection light from the reflector for specular reflection 33, but may cause light to directly enter without using reflection. Although a plurality of LEDs are provided in the longitudinal direction in the above exemplary embodiments, the light guide may extend in the longitudinal direction, and a power LED may be provided at an end portion in the longitudinal direction. Light from the plurality of LEDs provided in the longitudinal direction may be directly oriented to the original without using the light guide.

[3-5] Angle

Although the above exemplary embodiments show an example in which angles of the incident light and the reflection light are set small, the angles may be disposed such that the specular reflection light is guided to the image sensor 60. Although the above exemplary embodiments show an example in which a member (emitting unit and reflector) that radiates the diffuse reflection light is closer to the original than the member that radiates the specular reflection light, but the member that radiates the diffuse reflection light may be far from the original. In this case, for example, the incident angle and the emission angle of the specular reflection light are disposed to be inclined by 40° with respect to the original. In this way, an optical path oriented to the original and an optical path from the original may be separated by a distance rather than aiming at an angle close to 0° as much as possible, so that disposition of the components is easy.

In particular, in a case where the original is directly irradiated with light without using the reflector and a slit is provided between the original and the light source, when the incident light and the reflection light are not configured to have an angle, the reflection light is easily blocked by the slit, making it difficult to dispose the components. The emitting unit for diffuse reflection is disposed on the same side of the optical path as the emitting unit for specular reflection, but may be disposed on different sides.

Figure 15:
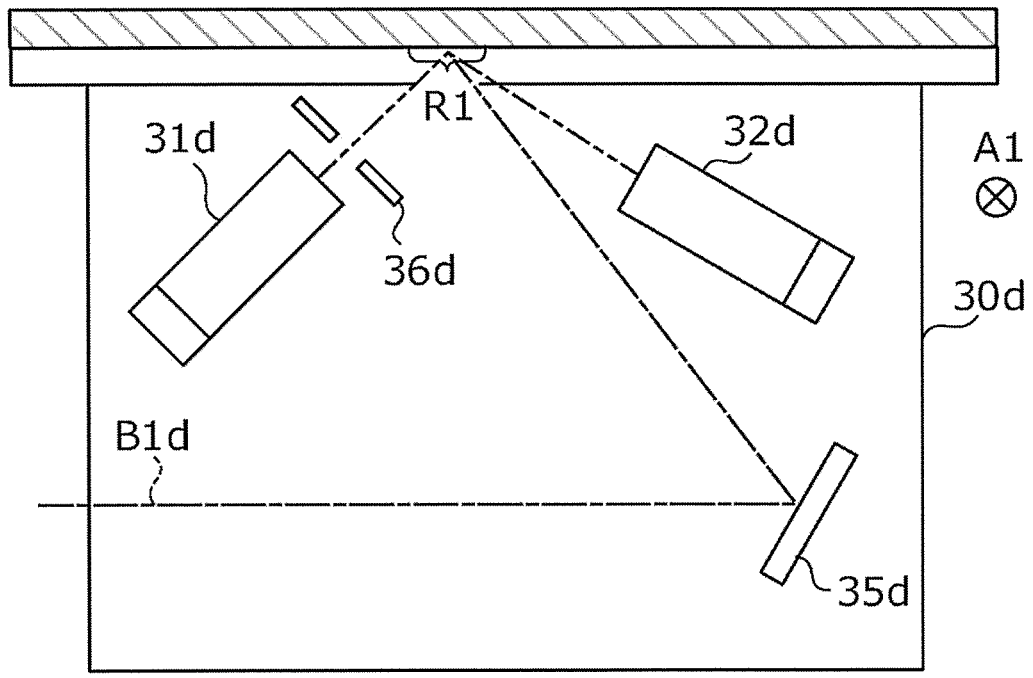
FIG. 15 is an enlarged view of a carriage of a modification.

FIG. 15 is an enlarged view of a carriage 30d of this modification. The carriage 30d includes a light emitting unit for specular reflection 31d, a light emitting unit for diffuse reflection 32d, a minor 35d, and a slit 36d.

The light emitting unit for specular reflection 31d is disposed on a different side of an optical path B1d from the light emitting unit for diffuse reflection 32d. The light emitting unit for diffuse reflection 32d directly irradiates the reading region R1 of the original 2 with light without using a reflector. The slit 36d is provided between the light emitting unit for specular reflection 31d and the original 2. In the example of FIG. 15, a height of a reading device in a vertical direction with respect to the original 2 is kept low as compared with a case where a light source is disposed vertically below the reading region R1.

[3-6] In the above exemplary embodiments regarding an optical axis, although the optical axis C1 is located at the center of the optical path, the optical axis C1 may be included in and approach one side of the optical path, or the optical axis C1 may not be included in the optical path.

Figure 16:
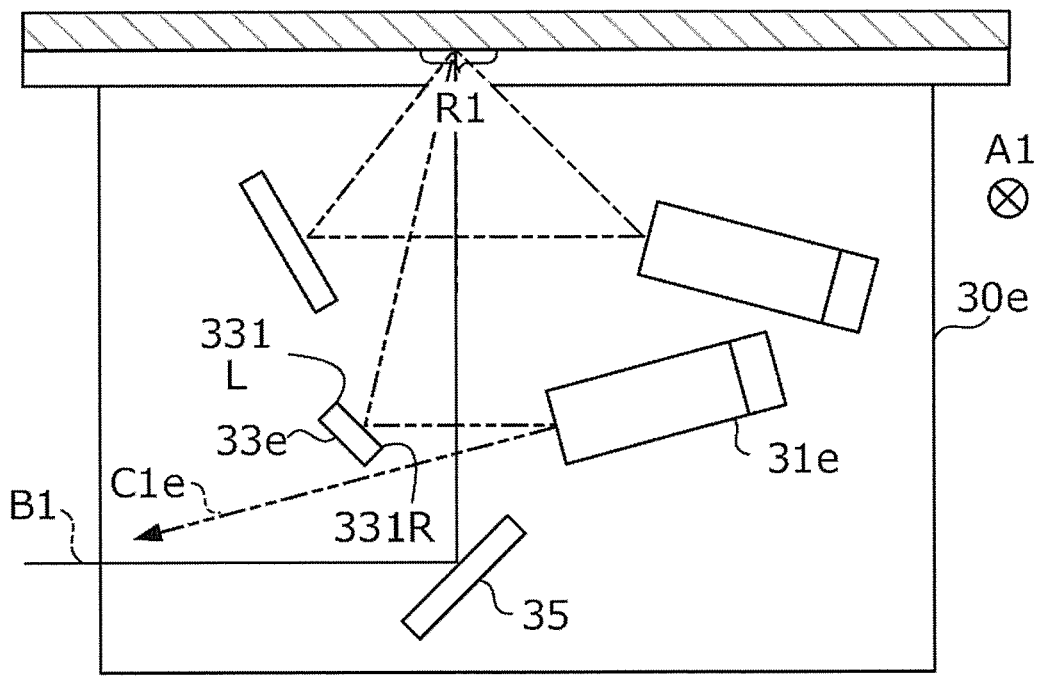
FIG. 16 is an enlarged view of a carriage of a modification.

FIG. 16 is an enlarged view of a carriage 30e of this modification. The carriage 30e includes a light emitting unit for specular reflection 31e facing a direction where an optical axis Cle is deviated from a reflector for specular reflection 33e in addition to the light emitting unit for specular reflection 31e shown in FIG. 3.

Luminous flux reflected by a left end region 331L and a right end region 331R of a reflection surface 331e of the reflector for specular reflection 33e will be described with reference to FIG. 17.

Figure 17:
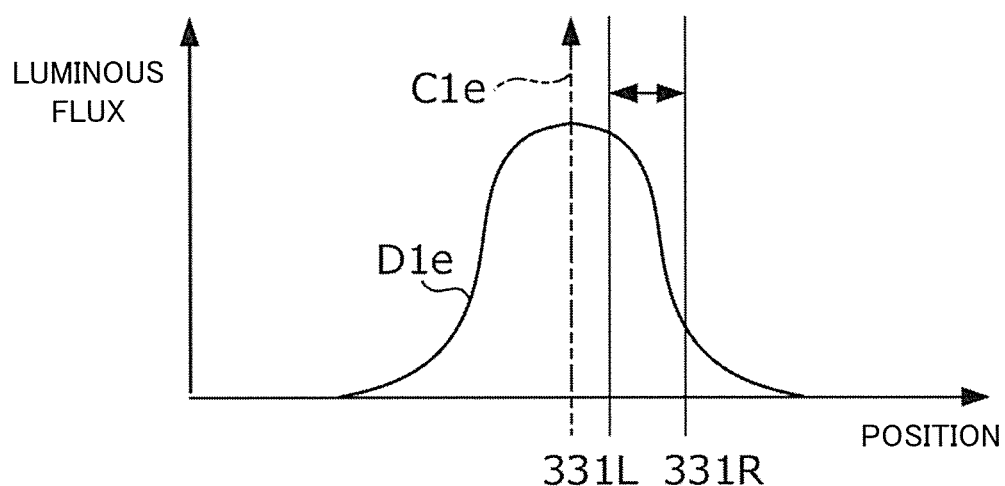
FIG. 17 shows an example of luminous flux distribution of light emitted by a light emitting unit for specular reflection.

FIG. 17 shows an example of luminous flux distribution of light emitted by the light emitting unit for specular reflection 31e. In an example of FIG. 17, distribution D1e of the luminous flux in a case where a plane located at a predetermined distance from the light emitting unit for specular reflection 31e is viewed in a direction along the main scanning direction A1 is shown in the graph.

The example of FIG. 17 shows an amount of reflection light at the left end region 331L and an amount of reflection light at the right end region 331R, and the former is larger than the latter. The optical axis Cle is not included in reflection light of the reflector for specular reflection 33e. The optical axis Cle is included in the reflection light of the reflector for specular reflection 33e, but may be disposed to approach one side (either of the left end region 331L and the right end region 331R).

In the example of FIG. 16, a luminous flux difference occurs in the optical path guided to the reading region R1 of the original, and the reflector for specular reflection 33e is disposed at a position where the original reflection light is obtained, in which a part having a large luminous flux (an optical path reflected by the left end region 331L) is closer to full specular reflection than a part having a small luminous flux (an optical path reflected by the right end region 331R).

In a case where the optical axis Cle of the light emitting unit for specular reflection 31e is not included in the optical path to the original or the optical axis Cle approaches one side (either of the left end region 331L and the right end region 331R) as described above, compared with the case where the optical axis is the center of the optical path, it is easy to cause a partial difference in luminous flux going toward the original 2. In a case where the optical axis Cle approaches the left end region 331L, it is preferable that reflection at the left end region 331L having high luminous flux is incident at an angle where the light is specularly reflected, and reflection at the right end region 331R having a small luminous flux is incident at an angle far from the angle where the light is specularly reflected.

For example, in a case where only a part of the emitted light is reflected by the reflector for specular reflection 33e, an end portion closer to the specular reflection angle is preferably set as the left end region 331L, and an end portion having a large amount of deviation from the specular reflection angle is set as the right end region 331R. As a result, a ratio of the specular reflection light increases as compared with a case where the end portion closer to the specular reflection angle is set as the right end region 331R.

[3-7] Light Emitting Unit

The shape of the light emitting unit is not limited to those described in the exemplary embodiments. For example, in the light emitting unit, the emission surface may have a shape other than a rectangle. In addition, the emitting unit may include two or more surfaces instead of one surface as the emission surface.

Figure 18:
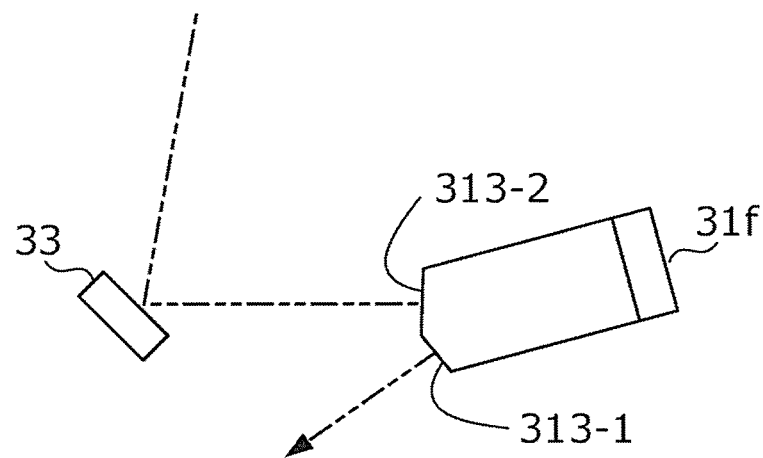
FIG. 18 shows a light emitting unit for specular reflection of a modification.

FIG. 18 shows a light emitting unit for specular reflection 31f of this modification. The light emitting unit for specular reflection 31f has a first emission surface 313-1 and a second emission surface 313-2, and emits light from the emission surfaces respectively. In the example of FIG. 18, in the light emitting unit for specular reflection 31f, since the light emitted from the first emission surface 313-1 is disposed toward the reflector for specular reflection 33, the first emission surface 313-1 corresponds to the emission surface 313 of the light emitting unit for specular reflection 31 of the above exemplary embodiment. That is, the reflector for specular reflection 33 reflects a part of the light from the first emission surface 313-1.

In the configuration of FIG. 18, the light emitted from the second emission surface 313-2 does not go toward the reflector for specular reflection 33 and the original direction. In this modification, light is emitted from the second emission surface 313-2, but the second emission surface 313-2 is not a surface that is made to emit light. The light emitting unit for specular reflection 31f may be disposed such that the light emitted from the second emission surface 313-2 goes toward the original direction.

Two or more emission surfaces may be configured as the emission surface corresponding to the emission surface 313 of the light emitting unit for specular reflection 31 in the above exemplary embodiments. In this case, only a part of light from the two emission surfaces that emit light toward the reflector for specular reflection 33 may be made to go toward the original direction by the reflector for specular reflection 33 or the like.

[3-8] Unmagnification Optical System

The reading device of a reduction optical system is shown in the above exemplary embodiments, and may be applied to a reading device of an unmagnification optical system. The unmagnification optical system is, for example, a contact image sensor (CIS), and an LED light source that emits light and a SELFOC (registered trademark) lens which is an unmagnification lens through which the light reflected by the original 2 passes are configured integrally with a light receiving element or the like provided on extension thereof.

In the case of CIS, since there is a SELFOC (registered trademark) lens, it may be difficult to set the angles of the incident light and the reflection light small as in the above exemplary embodiments. In this case, for example, the incident light and the reflection light may be disposed in a state of inclining by 45° with respect to the original so that the angles of the incident light and the reflection light are the same. The incident light may be limited by providing a slit between the LED light source and the original.

[3-9] Reading Device

The reading device that reads the original placed on the original table has been described in the above exemplary embodiments, to which the present invention is not limited, but may be applied to, for example, an in-line sensor disposed in a conveyance direction of the original being conveyed, or a reading device that reads a sheet being conveyed as the original. In the above exemplary embodiments, two times of reading of turning on a light source for specular reflection and reading of turning on the light source for diffuse reflection are performed on one original.

In contrast, in the case of the in-line sensor, an image sensor may be provided for each of the specular reflection light source and the diffusion light source and may perform reading at a different position in the conveyance direction, and modes desired to be read, for example, the light source for diffuse reflection is turned on when it is desired to read chromaticity in priority and the light source for specular reflection is turned on when it is desired to read gloss in priority, may be switched. Even if not all of originals being conveyed are read, the light source for diffuse reflection and the light source for specular reflection may be switched at an interval of certain sheets by inspection or the like instead of whole inspection.

[3-10] Output Device

A result read by the image reading device 10 may be output.

Figure 19:
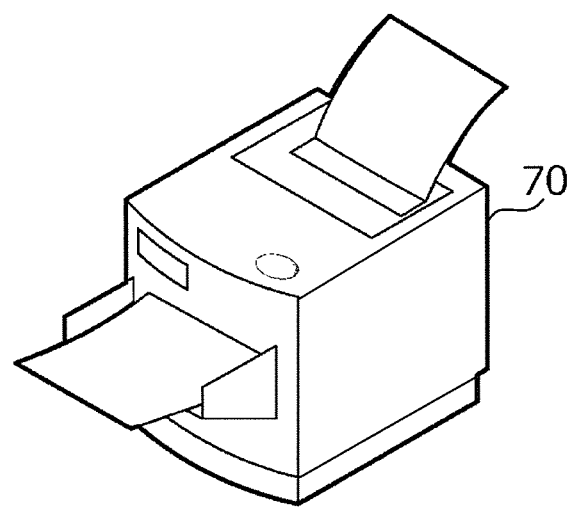
FIG. 19 shows an image forming device of a modification.

FIG. 19 shows an image forming device 70 of this modification. The image forming device 70 includes the image reading device 10 shown in FIG. 2. The stronger the specular reflection light in the reading region, the higher glossiness of the reading region, so that which position of the original is how glossy is obtained by calculation by a CPU or the like. In this case, a difference from the diffuse reflection light may also be used.

The image forming device 70 forms an image reflecting the result as image data by ink jet. In this way, the image forming device 70 outputs a specular reflection degree based on the specular reflection light read by the image reading device 10. More specifically, the image forming device 70 outputs an image formed based on the specular reflection degree read by the image reading device 10. In addition to output by the image forming device, an image may be processed according to a glossiness degree and output to a display device such as screens of a PC or a tablet.

In this exemplary embodiment, the same components may be used for the light emitting unit for specular reflection 31 and the light emitting unit for diffuse reflection 32. In this case, the luminous flux emitted by the light source 311 of the light emitting unit for specular reflection 31 is common to the luminous flux emitted by the light source 321 of the light emitting unit for diffuse reflection 32, and the luminous flux emitted by the light guide 312 of the light emitting unit for specular reflection 31 is also common to the luminous flux emitted by the light guide 322 of the light emitting unit for diffuse reflection 32.

The light reflected by the original 2 reaches the mirror 35 shown in FIG. 2. The light reflected by the mirror 35 is guided by the mirror 41, the mirror 42, and the image forming lens 50 shown in FIG. 2, and reaches the image sensor 60. In this way, the light guide 322, the reflector for specular reflection 34, the mirror 35, the mirror 41, the mirror 42, and the image forming lens 50 function as a specular reflection optical system 4 that specularly reflects a determined luminous flux emitted by the light source 321 by the reading region R1 of the original 2 to the image sensor 60.

The image sensor 60 generates an image shown by the light guided by the specular reflection optical system 4, that is, the light diffusely reflected by the original 2. As described above, the image sensor 60 generates an image from either the light specularly reflected or the light diffusely reflected by the reading region R1.

The dimension W4 in a transverse direction A5 of the reflection surface 341 of the reflector for specular reflection 34 included in the specular reflection optical system 4 is shorter than the dimension W3 in the transverse direction A4 of the reflection surface 331 of the reflector for diffuse reflection 33 included in a diffusion optical system 3. Therefore, as described above, the luminous flux emitted by the light source 311 of the light emitting unit for diffuse reflection 31 is common to the luminous flux emitted by the light source 321 of the light emitting unit for specular reflection 32, but the light reflected by the reflector for specular reflection 34 is less than the light reflected by the reflector for diffuse reflection 33.

As a result, in the specular reflection optical system 4, the luminous flux reaching the reading region R1 is smaller than the luminous flux in the diffusion optical system 3. A distance between the emission surface 323 and the reflection surface 341 in the specular reflection optical system 4 is shorter than a distance between the emission surface 313 and the reflection surface 331 in the diffusion optical system 3.

Since the emitted light diverges little by little, the luminous flux reflected by the reflection surface 341 close to the emission surface is larger than that of light reflected by the reflection surface 331 when the dimensions of the reflection surface 331 and the reflection surface 341 in the transverse direction are temporarily the same. However, as compared with the reflection surface 331, the reflection surface 341 denies a large luminous flux due to an influence of the distance from the emission surface to reduce the luminous flux to be reflected by reducing the dimension in the transverse direction as described above.

Regarding the luminous flux reflected in the reading region R1 and going toward the image sensor 60, the diffuse reflection light in which incident light is reflected in all directions is less than the specular reflection light including most incident light. In this exemplary embodiment, by setting the luminous flux reaching the reading region R1 in the above relationship, difference in the luminous flux when the diffuse reflection light and the specular reflection light having a common luminous flux of the light source reach the image sensor 60 is reduced as compared with a case where a relationship of the luminous flux is opposite.

The light source 321 in the specular reflection optical system 4 is provided at a position farther from the original 2 than the light source 311 in the diffusion optical system 3. Thus, a distance along the optical path from the light source 321 to the original 2 in the specular reflection optical system 4 is easy to be disposed shorter than a distance along the optical path from the light source 311 to the original 2 in the diffusion optical system 3, as compared with a case where a condition of the distance from the original 2 to the light source is opposite to that in this exemplary embodiment.

In other words, in disposition of the reflection surfaces (the reflection surface 331 in the diffusion optical system 3 and the reflection surface 341 in the specular reflection optical system 4), difference in the luminous flux when the diffuse reflection light and the specular reflection light having a common luminous flux of the light source reach the image sensor 60 is easily reduced compared with the case where a condition of the distance from the original 2 to the light source is opposite to that in this exemplary embodiment.

Similarly, the reflector for specular reflection 34 in the specular reflection optical system 4 is provided at a position farther from the original 2 than the reflector for diffuse reflection 33 in the diffusion optical system 3. Also in this case, in disposition of the reflection surfaces (the reflection surface 331 in the diffusion optical system 3 and the reflection surface 341 in the specular reflection optical system 4), difference in the luminous flux when the diffuse reflection light and the specular reflection light having a common luminous flux of the light source reach the image sensor 60 is easily reduced compared with a case where a condition of a distance from the original 2 to the reflector is opposite to that in this exemplary embodiment.

This application includes the following inventions.

[A1]

A reading device including:

a diffusion optical system that diffusely reflects a determined luminous flux emitted by a first light source on a reading region of an original and guides the light to a light receiving element; and a specular reflection optical system that specularly reflects the luminous flux emitted by a second light source on the reading region and guides the light to the light receiving element, in which luminous flux reaching the reading region is smaller than the luminous flux in the diffusion optical system.

[A2] The reading device according to A1, in which the diffusion optical system also guides light emitted by the first light source and diffusely reflected by directly reaching the reading region to the light receiving element.

[A3]

The reading device according to A1, in which the diffusion optical system includes a first reflection unit, the specular reflection optical system includes a second reflection unit, and light reflected by the second reflection unit is less than light reflected by the first reflection unit.

[A4]

The reading device according to any one of A1 to A3, in which the second light source is provided at a position farther from the original than the first light source.

[A5]

The reading device according to A4, in which the first light source and the second light source are disposed on the same side as that of light reflected in the reading region.

[A6]

The reading device according to A4 or A5, in which the first light source includes a first substrate and a first light emitting unit provided against a first end of the first substrate and emits light, the second light source includes a second substrate and a second light emitting unit provided against a second end of the second substrate and emitting light, and the first light source and the second light source are provided so that the first end and the second end adjoin each other.

[A7]

The reading device according to A6, in which the first substrate and the second substrate are produced as a common component.

[A8]

The reading device according to A6 or A7, in which the first substrate is fixed by a fastener provided on a side opposite to the first end, and the second substrate is fixed by a fastener provided on a side opposite to the second end.

[A9]

The reading device according to any one of A6 to A8, including:

a frame to which a component is attached; and as the component, a first light guide that reflects light emitted by the first light emitting unit, a second light guide that reflects light emitted by the first light guide, a second light guide that emits light emitted by the second light emitting unit, and a second reflection unit that reflects light emitted by the second light guide, in which the component is attached to the frame in an order of the second substrate, the second light guide, the second reflection unit, the first substrate, the first light guide, and the first reflection unit.

[A10]

The reading device according to A9, in which the first substrate, the first light guide, and the first reflection unit are attached to the frame from a first direction, and the second substrate, the second light guide, and the second reflection unit are attached to the frame from a second direction opposite to the first direction.

[A11]

The reading device according to A9 or A10, in which the first reflection unit is provided at a position farther from the original than the second reflection unit.

[A12]

An output device including:

the reading device according to any one of A1 to A11, which outputs a specular reflection degree based on specular reflection light read by the reading device.

[A13]

An image forming device including:

the output device according to A12, which outputs an image formed based on the specular reflection degree read by the reading device.

[B1]

A reading device including:

a transparent original table in contact with an original;

a radiation unit that irradiates light in a direction not going toward a reading region of the original in contact with the original table;

a reflection unit that reflects the light radiated from the radiation unit toward the reading region; and an image sensor that generates an image showing light reflected by the reflection unit and reflected in the reading region.

[B2]

The reading device according to B1, in which the radiation unit is provided so as to have an emission surface where light is emitted toward a determined range and not to include the reading region in the range.

[B3]

The reading device according to B1, in which the radiation unit has an emission surface where light is emitted, and the reading device includes a blocking unit that blocks the light emitted from the emission surface on the reading region side of the emission surface.

[B4]

The reading device according to B3, including:

a second radiation unit that radiates light in a direction going toward the reading region; and an optical path unit that forms an optical path guiding light reflected by the reflection unit and specularly reflected in the reading region and light radiated by the second radiation unit and diffusely reflected in the reading region together.

[B5]

The reading device according to B3 or B4, in which the radiation unit includes a light source that emits light and a light guide that guides the light emitted by the light source, and the blocking unit is attached to the reading region side of the light guide to reinforce the light guide.

[B6]

The reading device according to B5, in which the light guide is supported by the blocking unit.

[B7]

The reading device according to B1, in which the radiation unit has an emission surface where light is emitted, and a direction toward the reading region of the emission surface is masked.

[B8]

An output device including: the reading device according to any one of B1 to B7, which outputs a specular reflection degree based on specular reflection light read by the reading device.

[B9]

An image forming device including: the output device according to B8, which outputs an image formed based on the specular reflection degree read by the reading device.

[C1]

A reading device including:

an image sensor that generates an image from either light diffusely reflected or light specularly reflected by a reading region;

a diffuse reflection radiation unit that uses a main scanning direction as a longitudinal direction and radiates the diffusely reflected light toward the reading region; and a specular reflection radiation unit that uses the main scanning direction as a longitudinal direction and radiates the specularly reflected light toward the reading region, which radiates light having a width in a transverse direction orthogonal to the longitudinal direction smaller than the width of the diffuse reflection radiation unit.

[C2]

A reading device including:

an image sensor that generates an image from either light diffusely reflected or light specularly reflected by a reading region;

a diffuse reflection radiation unit having a reflection surface that uses a main scanning direction as a longitudinal direction and reflects the diffusely reflected light toward the reading region; and a specular reflection radiation unit having a reflection surface that uses the main scanning direction as a longitudinal direction and reflects the specularly reflected light toward the reading region, which has a smaller dimension in a transverse direction of the reflection surface than the diffuse reflection radiation unit.

[C3]

The reading device according to C1 or C2, including:

an emitting unit that emits light toward the diffuse reflection radiation unit and the reading region separately, in which the image sensor generates an image from light emitted by the emitting unit and diffusely reflected by directly reaching the reading region.

[C4]

The reading device according to C1 or C2, in which
the diffuse reflection radiation unit reflects light emitted from a first emission surface,
the specular reflection radiation unit reflects light emitted from a second emission surface, and
a distance between the second emission surface and the reflection surface of the specular reflection radiation unit is shorter than a distance between the first emission surface to the reflection surface of the diffuse reflection radiation unit.

[C5]

The reading device according to C4, including:
a first blocking unit that prevents the light emitted from the first emission surface from directly reaching the reflection surface of the specular reflection radiation unit.

[C6]

The reading device according to C5, including:
a second blocking unit that prevents the light emitted from the second emission surface from directly reaching the reading region, which is integrated with the first blocking unit.

[C7]

The reading device according to any one of C1 to C6, in which
the reflection surface of the specular reflection radiation unit has a larger degree of changing a traveling direction of a light ray included in the light into a converging direction when incident light is reflected than the reflection surface of the diffuse reflection radiation unit.

[C8]

The reading device according to any one of C1 to C7, in which
a light source that emits light incident on the diffuse reflection radiation unit has a larger degree of diffusion of the emitted light than that of a light source that emits light incident on the specular reflection radiation unit.

[C9]

An output device including:
the reading device according to any one of C1 to C8,
which outputs a specular reflection degree based on specular reflection light read by the reading device.

[C10]

An image forming device including:
the output device according to C9,
which outputs an image aimed based on the specular reflection degree read by the reading device.

[D1]

A reading device including:
an emitting unit that emits light and has an emission surface using a main scanning direction as a longitudinal direction;
a reflection unit that reflects light emitted from the emission surface and has a reflection surface using the main scanning direction as a longitudinal direction, in which a transverse dimension of the reflection surface is shorter than a transverse dimension of the emission surface; and
an image sensor that generates an image showing light reflected by the reflection unit and specularly reflected by an original.

[D2]

The reading device according to D1, in which
the reflection surface is disposed in a direction in which an amount of the light emitted by the emitting unit is the largest.

[D3]

The reading device according to D1 or D2, in which
the emission surface is rectangular.

[D4]

The reading device according to any one of D1 to D3, in which
the emitting unit includes a light source that emits light and a light guide that has the plane emission surface and guides light from the light source to the emission surface, in which the light guide has a part whose cross section that intersects with a plane orthogonal to the emission surface is rectangular.

[D5]

The reading device according to any one of D1 to D4, including:
a second emitting unit that emits light and has a second emission surface using the main scanning direction as a longitudinal direction, which is disposed such that the image sensor generates an image showing light emitted by a self-emitting unit and diffusely reflected by the original.

[D6]

The reading device according to any one of D1 to D5, in which
the emission surface has a diffusion unit that diffuses light to be emitted.

[D7]

The reading device according to D5, in which
the emission surface for diffuse reflection included in the second emitting unit has a larger degree of diffusing light to be emitted than that of the emission surface for specular reflection included in the emitting unit.

[D8]

An output device including:
the reading device according to any one of D1 to D7,
which outputs a specular reflection degree based on specular reflection light read by the reading device.

[D9]

An image forming device including:
the output device according to D8,
which outputs an image formed based on the specular reflection degree read by the reading device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A reading device comprising:
a first emitting unit configured to emit light;
an optical path unit having
a reflection surface configured to reflect a part of light emitted from the first emitting unit, and
an optical path configured to guide the part of light from the reflection surface to an original; and
an image sensor that generates an image from specular reflection of the part of light guided by the optical path from the original, the first emitting unit includes
an emission surface which is a plane, and
an optical axis which is an optical path of light emitted in a normal direction of the emission surface through the center of the emission surface,
wherein the reflection surface is disposed to reflect light around the optical axis at which an amount of the light emitted by the first emitting unit is the largest.

2. The reading device according to claim 1, wherein the optical path unit further comprises: a blocking unit that blocks a part of light that goes from the first emitting unit toward the reflection surface.

3. The reading device according to claim 2, wherein the blocking unit is disposed closer to the reflection surface than the first emitting unit.

4. The reading device according to claim 1, wherein the reflection surface is configured to converge the part of light on the original.

5. The reading device according to claim 1, wherein the emission surface of the first emitting unit is rectangular.

6. The reading device according to claim 1, further comprising:
a second emission unit having a second emission surface having a longitudinal direction on a main scanning direction of the original and configured to emit light such that diffuse reflection of the light emitted by the second emission unit from the original enters to the image sensor in an optical path common to the specular reflection of the light emitted from the first emission unit.

7. The reading device according to claim 1, wherein the light guided to the original has a difference in luminous intensity in the optical path, and
the optical path unit is configured to guide a part of luminous flux of the light having a highest luminous intensity to be irradiated on a position of the original where the part of luminous flux is specularly reflected into the image sensor.

8. An output device comprising:
the reading device according to claim 1,
wherein the output device is configured to output a specular reflection degree based on specular reflection light read by the reading device.

9. An image forming device comprising:
the output device according to claim 8,
which outputs an image formed based on the specular reflection degree read by the reading device.

10. The output device according to claim 8, wherein
the first emitting unit emits light and has an emission surface using a main scanning direction as a longitudinal direction;
the optical path unit reflects light emitted from the emission surface and has the reflection surface using the main scanning direction as a longitudinal direction, in which a transverse dimension of the reflection surface is shorter than a transverse dimension of the emission surface; and
the image sensor generates the image showing light reflected by the optical path unit and specularly reflected by the original.

11. A reading device comprising:
a diffusion optical system that diffusely reflects a determined luminous flux emitted by a first light source on a reading region of an original and guides the light to a light receiving element; and
a specular reflection optical system that specularly reflects the luminous flux emitted by a second light source on the reading region and guides the light to the light receiving element, in which luminous flux reaching the reading region is smaller than the luminous flux in the diffusion optical system, wherein
a dimension in a transverse direction of a reflection surface of a reflector for the specular reflection optical system is shorter than a dimension in a transverse direction of a reflection surface of a reflector for the diffusion optical system.

12. A reading device comprising:
an image sensor that generates an image from either light diffusely reflected or light specularly reflected by a reading region;
a diffuse reflection radiation unit that uses a main scanning direction as a longitudinal direction and radiates the diffusely reflected light toward the reading region; and
a specular reflection radiation unit that uses the main scanning direction as a longitudinal direction and radiates the specularly reflected light toward the reading region, which radiates light having a width in a transverse direction orthogonal to the longitudinal direction smaller than the width of the diffuse reflection radiation unit.

* * * * *